United States Patent
Pannell (10) Patent No.: US 9,565,118 B1
(45) Date of Patent: Feb. 7, 2017

(54) METHODS AND APPARATUS FOR HANDLING MANAGEMENT PACKETS IN AN AUDIO VIDEO BRIDGING (AVB) NETWORK

(75) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/115,682

(22) Filed: May 25, 2011

Related U.S. Application Data (60) Provisional application No. 61/348,693, filed on May 26, 2010.

(51) Int. Cl.
*H04L 12/851* (2013.01)
*H04L 12/833* (2013.01)
*H04L 12/70* (2013.01)

(52) U.S. Cl.
CPC ......... *H04L 47/2408* (2013.01); *H04L 47/245* (2013.01); *H04L 47/2458* (2013.01); *H04L 2012/5638* (2013.01)

(58) Field of Classification Search
CPC .. H04L 12/5695; H04L 47/724; H04L 12/462; H04L 47/2408; H04L 47/245; H04L 47/2458; H04L 2012/5638
See application file for complete search history.

(56) References Cited

U.S. PATENT DOCUMENTS

| | | | |
|---|---|---|---|
| 5,953,019 A * | 9/1999 | Shimakawa et al. | 345/535 |
| 6,052,683 A * | 4/2000 | Irwin | 707/758 |
| 6,377,782 B1 | 4/2002 | Bishop et al. | |
| 6,510,138 B1 | 1/2003 | Pannell | |
| 6,816,489 B1 * | 11/2004 | Patra et al. | 370/390 |
| 6,819,653 B1 * | 11/2004 | Hodgins et al. | 370/233 |
| 6,987,770 B1 * | 1/2006 | Yonge, III | 370/401 |
| 7,035,273 B1 | 4/2006 | Pannell et al. | |
| 7,110,415 B1 | 9/2006 | Walsh et al. | |
| 7,209,440 B1 | 4/2007 | Walsh et al. | |
| 7,457,297 B2 | 11/2008 | Woo et al. | |
| 2002/0087723 A1 * | 7/2002 | Williams et al. | 709/240 |
| 2005/0027837 A1 | 2/2005 | Roese et al. | |
| 2005/0054370 A1 | 3/2005 | Shpak | |
| 2005/0220105 A1 | 10/2005 | Yen et al. | |
| 2005/0281235 A1 * | 12/2005 | Beach et al. | 370/338 |
| 2007/0153802 A1 | 7/2007 | Anke et al. | |
| 2008/0037567 A1 | 2/2008 | Cho et al. | |

(Continued)

OTHER PUBLICATIONS

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, Dec. 9, 2005.

(Continued)

*Primary Examiner* — Walter Divito (57) ABSTRACT

It is determined whether a packet is a management-type packet. When it is determined that the packet is a management-type packet, a queue is selected from a plurality of queues corresponding to different priorities, wherein the selected queue corresponds to a defined throughput and/or a defined latency. The packet is enqueued in the selected queue. The packet is transmitted via a port of the network device.

20 Claims, 5 Drawing Sheets

(56) References Cited

U.S. PATENT DOCUMENTS

| | | | |
|---|---|---|---|
| 2008/0112433 A1 | 5/2008 | Feng et al. | |
| 2008/0114887 A1 | 5/2008 | Bryers et al. | |
| 2008/0123531 A1* | 5/2008 | Gerkis | 370/235 |
| 2008/0212591 A1 | 9/2008 | Wu et al. | |
| 2008/0285574 A1 | 11/2008 | Teener | |
| 2008/0288638 A1* | 11/2008 | Diab et al. | 709/225 |
| 2009/0016217 A1* | 1/2009 | Kashyap | 370/231 |
| 2009/0049175 A1 | 2/2009 | Finn | |
| 2009/0160943 A1 | 6/2009 | Badt, Jr. et al. | |
| 2009/0180389 A1* | 7/2009 | Mack-Crane et al. | 370/242 |
| 2009/0201844 A1* | 8/2009 | Bhatti et al. | 370/312 |
| 2010/0110898 A1* | 5/2010 | Effenberger | H04L 69/08 370/241.1 |
| 2010/0122098 A1 | 5/2010 | Kay | |
| 2010/0220724 A1 | 9/2010 | Rabie et al. | |
| 2010/0238836 A1 | 9/2010 | Diab et al. | |
| 2011/0029676 A1* | 2/2011 | Detrick | H04L 47/10 709/227 |
| 2011/0044226 A1 | 2/2011 | Song et al. | |

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, May 7, 2003.

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, Aug. 17, 2005, 60 pages.

IEEE Std 802.11e/D11.0, "IEEE Standard for Information technology—Telecommunications and information exchange between systems—Local and metropolitan area networks-Specific requirements, Part 11: Wireless Medium Access Control (MAC) and Physical Layer (PHY) Specifications: Amendment 7: Medium Access Control (MAC) Quality of Service (QoS) Enhancements, "*The Institute of Electrical and Electronics Engineers, Inc.*, Oct. 2004.

Office Action in U.S. Appl. No. 13/115,865 dated Feb. 15, 2013 (21 pages).

Office Action in U.S. Appl. No. 13/115,865 dated Jul. 23, 2013 (24 pages).

Office Action in U.S. Appl. No. 13/115,865 dated Feb. 4, 2014 (25 pages).

Office Action in U.S. Appl. No. 13/115,865 dated Jun. 30, 2014 (24 pages).

Office Action in U.S. Appl. No. 13/115,865 dated May 12, 2014 (15 pages).

Office Action in U.S. Appl. No. 13/115,868 dated Feb. 26, 2013 (16 pages).

Office Action in U.S. Appl. No. 13/115,868 dated Jul. 9, 2013 (19 pages).

Office Action in U.S. Appl. No. 13/115,868 dated Feb. 3, 2014 (16 pages).

Office Action in U.S. Appl. No. 13/115,868 dated Jul. 2, 2014 (17 pages).

Office Action in U.S. Appl. No. 13/115,868 dated Apr. 8, 2015 (15 pages).

Office Action in U.S. Appl. No. 13/115,670 dated Feb. 26, 2013 (17 pages).

Office Action in U.S. Appl. No. 13/115,670 dated Jul. 10, 2013 (20 pages).

Office Action in U.S. Appl. No. 13/115,670 dated Mar. 21, 2014 (24 pages).

Office Action in U.S. Appl. No. 13/115,670 dated Jul. 25, 2014 (24 pages).

Office Action in U.S. Appl. No. 13/115,670 dated May 4, 2015 (20 pages).

U.S. Appl. No. 13/115,670, Pannell et al., "Methods and Apparatus for Handling Multicast Packets in an Audio Video Bridging (AVB) Network," filed May 25, 2011.

U.S. Appl. No. 13/115,865, Pannell et al., "Enhanced Audio Video Bridging (AVB) Methods and Apparatus," filed May 25, 2011.

U.S. Appl. No. 13/115,868, Pannell et al., "Enhanced Audion Video Bridging (AVB) Methods and Apparatus," filed May 25, 2011.

IEEE P802.1AS/D0.8, "Draft Standard for Local and Metropolitan Area Networks—Timing and Synchronization for Time-Sensitive Applications in Bridged Local Area Networks," The Institute of Electrical and Electronics Engineers, Inc., pp. 1-149 (May 25, 2007).

Abstract of IEEE 802.1AS Standard, "802.1AS—Timing and Synchronization," *The Institute of Electrical and Electronics Engineers, Inc.*, available at http://www.ieee802.org/1/pages/802.1as.html, 1 page (Mar. 30, 2011).

Final Office Action in U.S. Appl. No. 13/115,868, dated Oct. 1, 2015 (18 pages).

Final Office Action in U.S. Appl. No. 13/115,670, dated Oct. 15, 2015 (25 pages).

Final Office Action in U.S. Appl. No. 13/115,865, dated Oct. 16, 2015 (20 pages).

\* cited by examiner

METHODS AND APPARATUS FOR HANDLING MANAGEMENT PACKETS IN AN AUDIO VIDEO BRIDGING (AVB) NETWORK

CROSS-REFERENCES TO RELATED APPLICATIONS

This disclosure claims the benefit of U.S. Provisional Patent Application No. 61/348,693, entitled "AUDIO VIDEO BRIDGING POLICY ENHANCEMENTS," filed on May 26, 2010, which is hereby incorporated by reference herein in its entirety.

This disclosure is related to the following U.S. Patent Applications filed on the same day as the present application:

U.S. patent application Ser. No. 13/115,670 entitled "METHODS AND APPARATUS FOR HANDLING MULTICAST PACKETS IN AN AUDIO VIDEO BRIDGING (AVB) NETWORK";

U.S. patent application Ser. No. 13/115,865 entitled "ENHANCED AUDIO VIDEO BRIDGING (AVB) METHODS AND APPARATUS";

U.S. patent application Ser. No. 13/115,868 entitled "ENHANCED AUDIO VIDEO BRIDGING (AVB) METHODS AND APPARATUS";

All of the above U.S. Patent Applications are hereby incorporated by reference herein in their entireties.

FIELD OF THE DISCLOSURE

The present disclosure relates generally to communication networks and, more particularly, to switch devices for handling low-latency streams.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Audio Video Bridging (AVB), is a set of standards developed and being developed by the Institute for Electrical and Electronics Engineers (IEEE) 802.1 working group with the intent of supporting real-time traffic, such as audio traffic and video traffic, with defined latencies and guaranteed delivery.

This is a change in direction as compared to past communication network protocols, such as the IEEE 802.3 Ethernet standard and the IEEE 802.11 wireless local area network (WLAN) standards, that are designed to be 'best effort' protocols. 'Best effort' here means that there are no guarantees of delivery nor is the latency through the network reasonably definable. These older Ethernet and WLAN networks are allowed to drop (or discard) data at Layer 1 and/or Layer 2, and it is the responsibility of higher layer protocols in the protocol stack to insure reliable delivery of data by the re-transmission of the dropped portions. Such re-transmissions insure users get the full content of their e-mails and other file transfers, but the re-transmissions do not help when the data is time sensitive such as audio and/or video streams. Re-transmission cannot be done in these cases as the window of usage of the information has usually past (i.e., the re-transmitted data typically shows up too late to help).

A phone conversation is an example application that uses real-time audio. The quality of a phone connection is typically excellent when making a POTS (Plain Old Telephone System) call. However, the same call using via the Internet is generally not as good and may not be acceptable at the present day. This is because a POTS network guarantees enough bandwidth for each call with defined latencies. The Internet currently cannot provide such guarantees.

A goal of AVB is to support real-time data streams with defined latencies and guaranteed delivery, over Ethernet- and WLAN-type networks, while at the same time allowing the previous (and future) applications to continue functioning on these same networks.

Devices configured to operate according to AVB (AVB devices) periodically exchange timing information that allows both ends of a link to synchronize their time base reference clock very precisely. This precise synchronization allows synchronization of multiple streams and provides a common time base for sampling/receiving data streams at a source device and presenting those streams at the destination device with the same relative timing.

AVB utilizes stream reservations to help insure that an AVB stream can start (or be joined to) only if all the bridges in the path of the stream have sufficient resources to support the stream. Resources include available buffers and bandwidth of the links. Additionally, AVB reservations help insure that no more than 75% of a link's bandwidth (as a default) is used for AVB streams. This helps insure the applications of the network can continue to function as before.

AVB also utilizes stream shaping to define how AVB data should be transmitted in the absence of congestion. Traffic shaping is a process of smoothing out the traffic for a stream so that the packets making up the stream are evenly distributed in time. If traffic shaping is not done at sources and bridges, then packets of a stream tend to "bunch" into bursts of traffic that can overwhelm buffers in subsequent bridges, switches and other infrastructure devices. AVB implements traffic shaping using existing IEEE 802.1Q forwarding and priority mechanisms but also defines a particular relationship between priority tags and frame forwarding behavior at endpoints and bridges.

SUMMARY

In one embodiment, a method implemented in a network device includes determining whether a packet is a management-type packet. The method also includes, when it is determined that the packet is a management-type packet selecting a queue from a plurality of queues corresponding to different priorities, wherein the selected queue corresponds to a defined throughput and/or a defined latency, and enqueuing the packet in the selected queue. The method additionally includes transmitting the packet via a port of the network device.

In another embodiment, a network device comprises a plurality of ports, and a queue controller having a plurality of queues associated with one of the plurality of ports, wherein the plurality of queues correspond to different priorities, wherein the plurality of queues includes a first queue corresponding to a defined throughput and/or a defined latency. The queue controller is configured to select the first queue for management-type packets to be transmitted via the one port, and enqueue management-type packets to be transmitted via the one port in the first queue. The network device is configured to determine whether a packet is a management-type packet, and transmit packets from the first queue via the one port.

In yet another embodiment, a method implemented in a network device includes for each packet of a plurality of packets, utilizing a forwarding database and header information to determine a port of the network device via which to transmit the packet, and for each packet of the plurality of packets to be transmitted via a port coupled to a device configured to utilize a communication protocol that provides a defined throughput and/or a defined latency, determining whether the packet has a first frame priority, and when it is determined that the packet has the first frame priority, enqueuing the packet in a first queue associated with a defined first throughput and/or a defined first latency. The method also includes determining whether the packet is a management-type packet, and when it is determined that the packet is a management-type packet, enqueuing the packet in the first queue whether or not the packet has the first frame priority. The method additionally includes, when it is determined that the packet does not have the first frame priority or is not a management-type packet, enqueuing the packet in the one or more queues different than the first queue, wherein the first queue and the one or more other queues correspond to different priorities. The method further includes transmitting packets in the first queue and the one or more queues via the port coupled to the device configured to utilize the communication protocol that provides defined throughput and/or defined latency.

In still another embodiment; a network device comprises a plurality of ports including a first port communicatively coupled to a device configured to utilize a communication protocol that provides a defined throughput and/or a defined latency. The network device also comprises a forwarding database. The network device is configured to utilize the forwarding database to determine a plurality of packets to be transmitted via the first port, and for each packet of the plurality of packets, determine whether the packet has a first frame priority. The network device is also configured to, for each packet of the plurality of packets, determine whether the packet is a management-type packet. The network device also comprises a queue controller including a queue associated with the first port, wherein the queue controller includes i) a first queue associated with the first port and associated with a defined first throughput and/or a defined first latency, and ii) one or more queues different than the first queue, wherein the first queue and the one or more other queues correspond to different priorities. The queue controller is configured to enqueue the packet in the first queue when it is determined that the packet has the first frame priority, and enqueue the packet in the first queue whether or not the packet has the first frame priority when it is determined that the packet is a management-type packet. The queue controller is also configured to enqueue the packet in one of the one or more queues different than the first queue when it is determined that the packet does not have the first frame priority or is not a management-type packet. The network device is configured to transmit packets enqueued in the first queue and the one or more other queues via the first port.

DETAILED DESCRIPTION

In embodiments described below, a network device such as a Layer-2 and/or Layer 3 switch/router/bridge device (referred to herein as a "switch" for convenience) is configured to operate according to the Audio Video Bridging (AVB) protocol being developed by the IEEE 802.1 working group. In various embodiments, the switch is configured to provide one or more enhancements that enable improved performance of the switch and/or network. Some of the enhancements enable improved handling of management-type packets.

Figure 1:
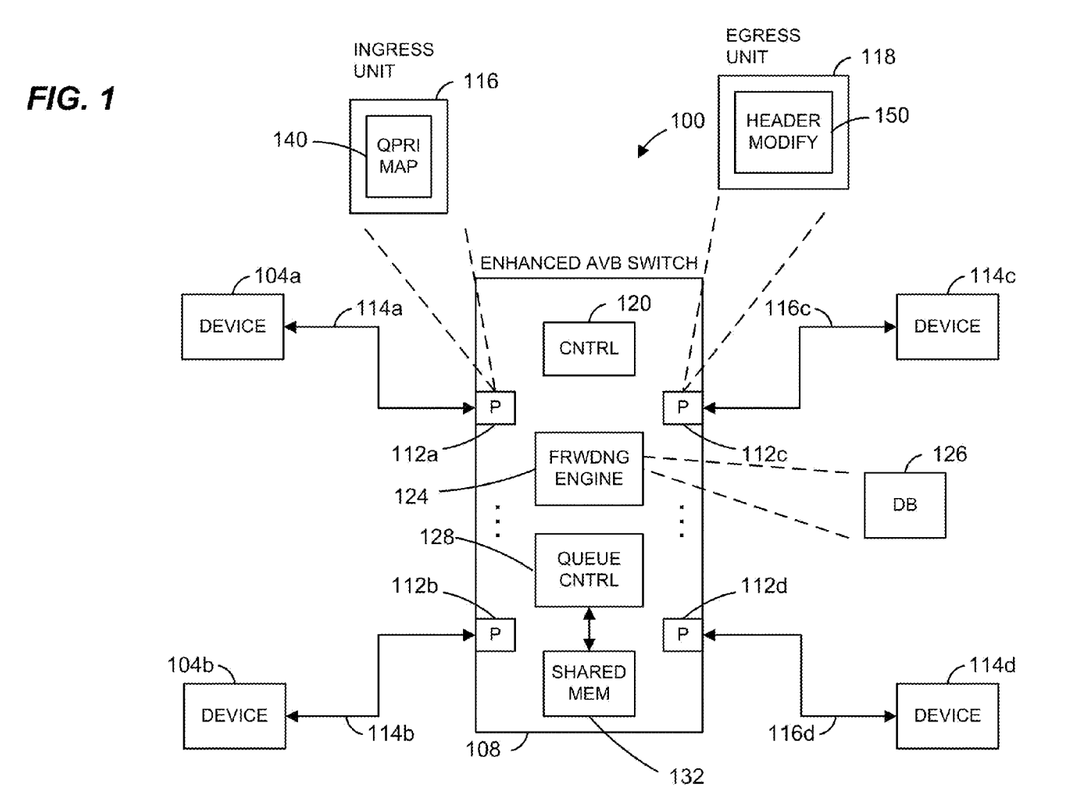
FIG. 1 is a block diagram of an example network 100 according to an embodiment.

FIG. 1 is a block diagram of an example network 100 according to an embodiment. The network 100 includes a plurality of devices 104 communicatively coupled to a switch 108. The switch 108 (referred to herein as an "enhanced AVB switch") is configured to operate according to the AVB protocol and configured to provide one or more enhancements that enable improved performance of the switch 108 and/or network 100, in some embodiments.

The enhanced AVB switch 108 includes a plurality of ports 112. The plurality of devices 104 are communicatively coupled to the enhanced AVB switch 108 via the ports 112. For example, the device 104a is communicatively coupled to the port 112a; the device 104b is communicatively coupled to the port 112b, and so on. Although the enhanced AVB switch 108 is depicted in FIG. 1 as having at least four ports 112, the enhanced AVB switch 108 includes a different suitable number of ports in other embodiments. Although the network 100 is depicted in FIG. 1 as having four devices 104, the network 100 includes a different suitable number of devices 104 in other embodiments. Each device 104 is a suitable electronic device that sources data, is a destination of data sourced by another device 104, or forwards data. For example, the devices 104 may include one or more of desktop computers, laptop computers, smart phones, audio/visual equipment, network attached storage devices, printers, network switches, etc. Each device 104 is configured to transmit and receive packets via a respective communication link 114. Similarly, each port 112 is configured to transmit and received packets via the respective communication link 114.

In some embodiments and/or scenarios, a first set of one or more of the devices 104 are configured to operate according to the AVB protocol (referred to herein as "AVB devices"), whereas a second set of one or more of the devices 104 are not configured to operate according to the AVB protocol (referred to herein as "non-AVB devices"). In some embodiments, if an AVB device 104 is coupled to a port 112, the port 112 is configured to operate generally according to the AVB protocol (referred to sometimes herein as an "AVB port"). On the other hand, if a non-AVB device 104 is coupled to a port 112, the port 112 is not configured to operate according to the AVB protocol (referred to sometimes herein as a "non-AVB port"). In some embodiments, each port 112 is configured to determine whether the port 112 is coupled to an AVB device or a non-AVB device such as by communicating with the device 104 coupled to the port 112. In other embodiments, the controller 120 is configured to determine whether a port 112 is coupled to an AVB device or a non-AVB device such as by communicating with the device 104 coupled to the port 112.

In an embodiment, each port 112 includes an ingress processing unit 116. The ingress processing unit 116 generally processes packets that ingress via the port 112. Similarly, in an embodiment, each port includes an egress processing unit 118. The egress processing unit 118 generally processes packets that egress via the port 112.

In an embodiment, the enhanced AVB switch 108 includes a controller 120 that configures the ports 112 to either operate generally according to the AVB protocol or not according to the AVB protocol. In an embodiment, the controller 120 includes a processor that executes machine readable instructions stored in a memory of, or coupled to, the controller 120 (not shown). The controller 120 is coupled to the ports 112.

The enhanced AVB switch 108 also includes a forwarding engine 124 coupled to the ports 112 (coupling not shown in FIG. 1 for clarity). The forwarding engine 124 is configured to determine via which port or ports 112 a packet, which was received via one of the ports 112, should be transmitted. In some embodiments, the forwarding engine 124 analyzes data in a header of the packet to determine via which port or ports 112 the packet should be transmitted. For example, the forwarding engine 124 analyzes one or more of a destination address (unicast, multicast, or broadcast), a virtual local area network (VLAN) tag, etc., in the packet. The forwarding engine 124 includes a forwarding database 126 that stores forwarding information for different destination addresses (e.g., media access control (MAC) addresses, Internet Protocol (IP) addresses, VLANs, multicast addresses, etc.). In an embodiment, the forwarding engine 124 includes an address translation unit (ATU).

In an embodiment, the ingress units 116 of the ports 112 are coupled to the forwarding engine 124. For a port 112 via which a packet ingressed (an ingress port 112), the ingress port 112 utilizes forwarding information regarding the packet from the forwarding engine 124 to determine the port or ports 112 via which the packet is to be egressed (egress port(s) 112).

The enhanced AVB switch 108 also includes a queue controller 128 coupled to a shared memory 132. The queue controller 128 and the shared memory 128 are also coupled to the ports 112 (coupling not shown in FIG. 1 for clarity). When a packet is received via an ingress port 112, the ingress processing unit 116 of the ingress port 112 requests and receives one or more pointers from the queue controller 128. The ingress processing unit 116 then stores the packet at one or more buffers in the shared memory 132 that are indicated by the received pointers.

The ingress processing unit 116 interfaces with the forwarding engine 124 to determine the appropriate one or more ports 112 for egress (egress port(s)). The ingress processing unit 116 then sends the selected pointers and indications of the one or more egress ports(s) to the queue controller 128. The queue controller 128 then sends the pointers to the appropriate one or more egress port(s) 112. These egress port(s) 112 then retrieve the packet from the buffers indicated by the pointers and transmit the packet via respective links 116. These egress port(s) 112 then release the pointers for use by another incoming packet.

As will be described in more detail below, the ingress processing unit 116 includes a queue priority mapper 140 that generally determines a queue priority indicator that indicates an egress queue into which a packet should be placed, where different egress queues correspond to different priorities. Also as will be described in more detail below, the egress processing unit 118 includes a header modifier unit 150 that modifies a header of a packet before the packet is transmitted by the port 112 via the link 114.

Figure 2:
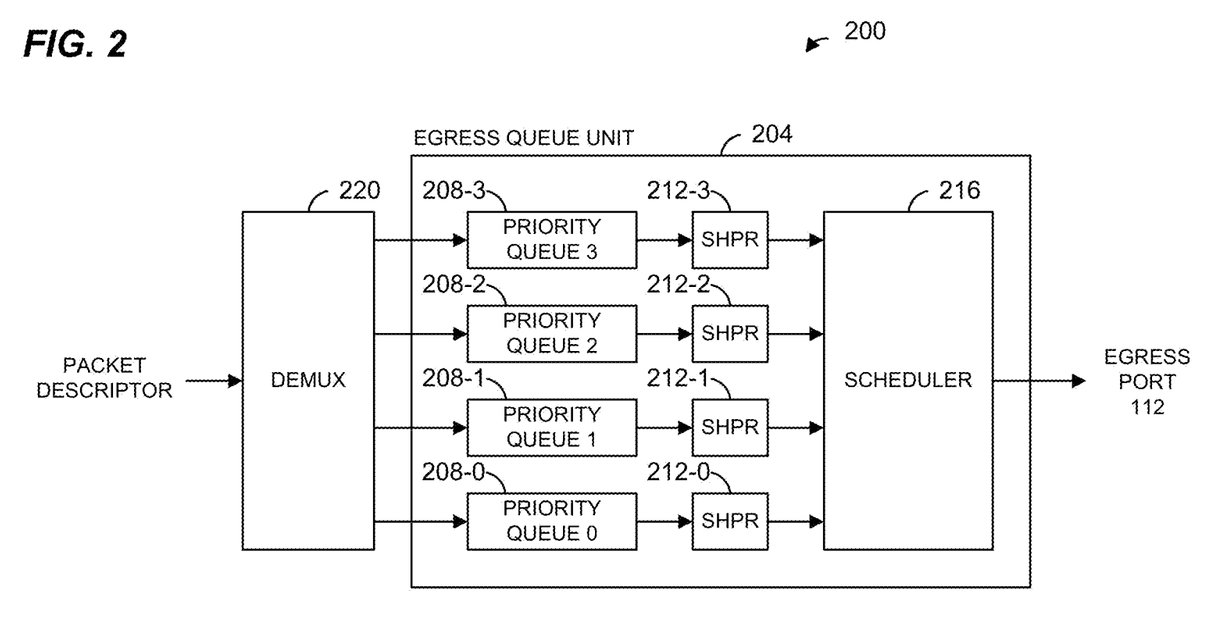
FIG. 2 is a block diagram of an example portion of a queue controller of FIG. 1, according to an embodiment.

FIG. 2 is a block diagram of an example portion 200 of the queue controller 128 of FIG. 1, according to an embodiment, and FIG. 2 will be described with reference to FIG. 1. The queue controller 128 includes a portion 200 for each port 112. The portion 200 includes an egress queue unit 204 coupled to the associated port 112. The egress queue unit 204 handles enqueuing packets for egress via the associated port 112.

More specifically, the egress queue unit 204 enqueues packet descriptors corresponding to packets and received from the forwarding engine 124. Each packet descriptor includes a pointer to a packet stored in one or more buffers in the shared memory 132. In some embodiments, the descriptor includes other information regarding the packet. For example, the descriptor includes a frame priority indicator associated with the packet, in an embodiment. The frame priority indicator indicates a priority assigned to the packet for transmission in the network and/or handling by the enhanced AVB switch, in an embodiment. The frame priority indicator is determined based on one or more of an IEEE 802.1p priority code point (PCP) field of an IEEE 802.1Q Standard VLAN tag in a header of the packet, a Differentiated Services Code Point (DSCP) field in an Internet Protocol (IP) header of the packet, an IP precedence field in the IP header, the port via which the packet was received, etc., in some embodiments. In another embodiment, the descriptor does not include the frame priority indicator.

The egress queue unit 204 includes a plurality of priority queues 208 corresponding to different priorities. In the example of FIG. 2, the egress queue unit 204 includes four priority queues 208 with priorities 3, 2, 1 and 0, where priority 3 is a highest priority and priority 0 is a lowest priority, in an embodiment. In other embodiments, another suitable number of priority queues 208 is utilized. Each queue 208 stores descriptors of packets to be transmitted from the egress port 112.

The egress queue unit 204 also includes a plurality of shaper units 212 coupled to the plurality of priority queues 208. In the example of FIG. 2, the egress queue unit 204 includes four shaper units 212 corresponding to the four priority queues 208, in an embodiment. In other embodiments, another suitable number of shaper units 212 is utilized. For example, in one embodiment, the shapers 212-0 and 212-1 are omitted. Each shaper unit 212 is configured to smooth out the traffic from the corresponding priority queue 208 so that the packets in the priority queue 208 making up a stream are evenly distributed in time.

A scheduler 216 is coupled to the egress port 112 and the priority queues 208 (via shaper units 212 in some embodiments). The scheduler 216 is configured to pass descriptors from the priority queues 208 to the egress port 112 in a manner such that precedence according to priority is given. In an embodiment, the scheduler 216 implements a strict priority queuing scheme. In other embodiments, other suitable weighting schemes are used, such as weighted fair priority queuing. According to weighted fair queuing, frames are processed so that over time, higher-priority frames are transmitted more often than lower-priority frames according to a predetermined weighting scheme and sequence. One example weighting scheme for four priorities is "8-4-2-1", in an embodiment. According to 8-4-2-1 weighting, in 15 consecutive time units, eight time units are allocated to priority 3, four time units are allocated to priority 2, two time units are allocated to priority 1, and one time unit is allocated to priority 0.

A demultiplexer unit 220 receives packet descriptors from the forwarding engine 124 and determines in which one of the priority queues 208 each packet descriptor should be placed. In an embodiment, the demultiplexer unit 220 analyzes a frame priority indictor of a packet and determines the appropriate priority queue 208 based on the priority tag of the packet. According to the AVB protocol, packets having an IEEE 802.1Q priority tag with a value 3 (as a default) should be placed in the priority queue 208-3; packets having an IEEE 802.1Q priority tag with a value 2 (as a default) should be placed in the priority queue 208-2; and, packets having an IEEE 802.1Q priority tag with a value other than 2 or 3 (as a default) should be placed in a priority queue with a lower priority than the priority queue 208-2 or the priority queue 208-3, e.g., in the priority queue 208-1 or the priority queue 208-0. The demultiplexer unit 220 then places the packet descriptor in the determined priority queue 208. According to the AVB protocol, a switch device can be configured so that packets having an IEEE 802.1Q PCP field with a value different than 3 are to be placed in the priority queue 208-3; and packets having an IEEE 802.1Q PCP field with a value different than 2 are to be placed in the priority queue 208-2.

In an embodiment, the demultiplexer unit 220 determines the appropriate priority queue 208 further based on whether the egress port 112 is coupled to an AVB device. For example, for a particular frame priority indicator, the demultiplexer unit 220 determines a first priority queue 208 when the egress port 112 is coupled to an AVB device and determines a second priority queue 208, different than the first priority queue 208 at least in some scenarios, when the egress port 112 is coupled to a non-AVB device, in an embodiment. As a specific example, for a frame priority indicator that corresponds to a IEEE 802.1Q priority tag with a value of three (as an example), the demultiplexer unit 220 determines the priority queue 208-3 when the egress port 112 is coupled to an AVB device and determines a priority queue 208 other than the priority queue 208-3, at least in some scenarios, when the egress port 112 is coupled to a non-AVB device, in an embodiment. As another specific example, for a frame priority indicator that corresponds to a IEEE 802.1Q priority tag with a value of two (as an example), the demultiplexer unit 220 determines the priority queue 208-2 when the egress port 112 is coupled to an AVB device 104 and determines a priority queue 208 other than the priority queue 208-2, at least in some scenarios, when the egress port 112 is coupled to a non-AVB device 104, in an embodiment.

In an embodiment, the portion 200 of the queue controller 128 corresponds to a particular port 112, and is configurable to operate in a first mode when the port 112 is communicatively coupled to a device that operates according to the AVB protocol. For example, when in the first mode, the portion 200 operates so that the queue 208-3 is treated as a Class A queue according to the AVB protocol, and the queue 208-2 is treated as a Class B queue according to the AVB protocol, in an embodiment. For instance, when in the first mode, the demultiplexer unit 220 places packets with a frame priority of value 3 (as an example) into the queue 208-3, places packets with a frame priority of value 2 (as an example) into the queue 208-2, and places packets with a frame priority of value other 2 or 3 (as an example) into the queue 208-1 or the queue 208-0, in an embodiment. In an embodiment, when in the first mode, the portion 200 operates so that packets enqueued in the queue 208-3 and the queue 208-2 are handled according to guaranteed delivery, a defined throughput, and/or a defined latency. On the other hand, when in the first mode, the portion 200 operates so that packets enqueued in the queue 208-1 and the queue 208-0, are handled with best effort delivery, in an embodiment. In an embodiment, the demultiplexer unit 220 is configurable so that the demultiplexer unit 220, in the first mode, places packets with an IEEE 802.1Q PCP field with a value different than 3 in the priority queue 208-3, and places packets having an IEEE 802.1Q PCP field with a value different than 2 in the priority queue 208-2.

In an embodiment, the portion 200 is also configurable to operate in a second mode when the port 112 associated with the portion 200 is communicatively coupled to a device that is not operating according to the AVB protocol. For example, when in the second mode, the demultiplexer unit 220 is not limited to placing packets with a frame priority of value 3 (as an example) into the queue 208-3, placing packets with a frame priority of value 2 (as an example) into the queue 208-2, and placing packets with a frame priority of value other 2 or 3 (as an example) into the queue 208-1 or the queue 208-0, in an embodiment. In an embodiment, when in the second mode, the portion 200 operates so that packets enqueued in the queues 208 are handled with best effort delivery.

Figure 3:
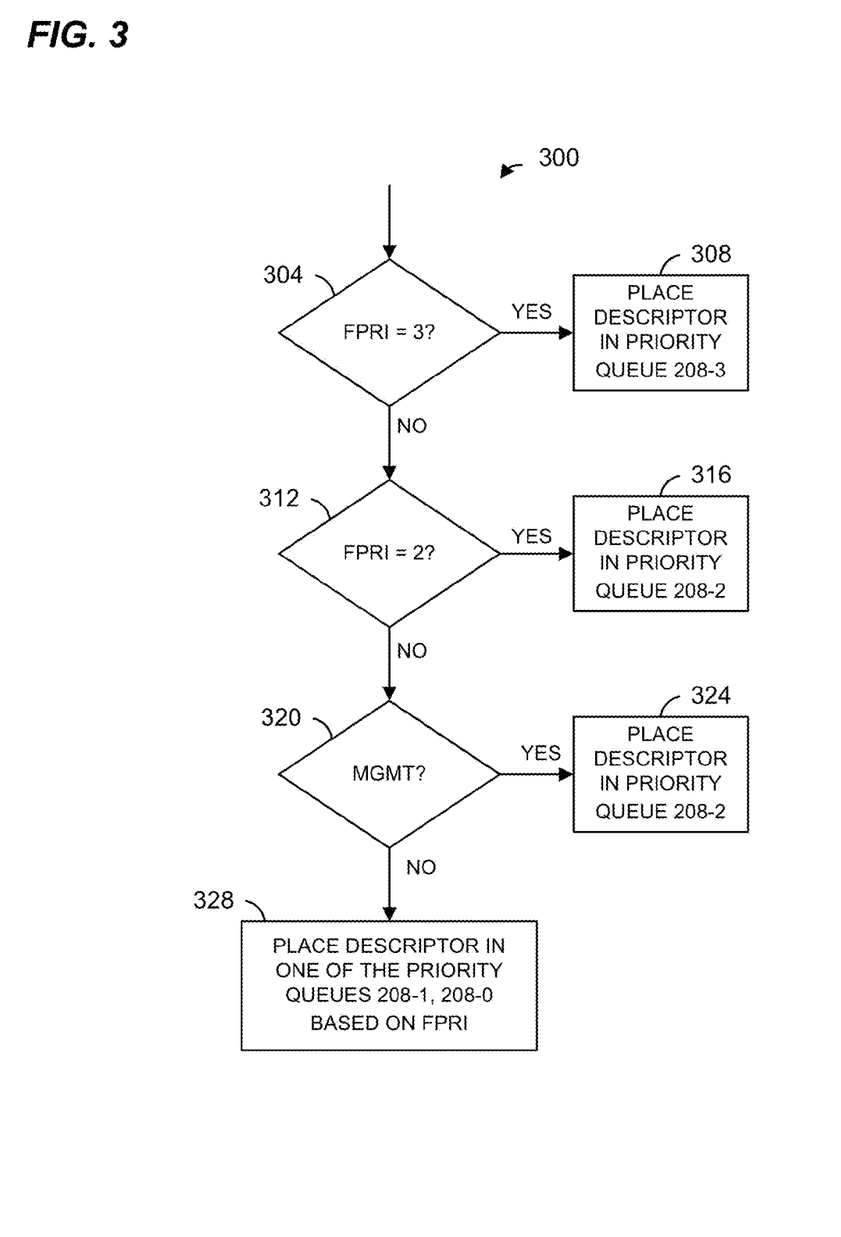
FIG. 3 is a flow diagram of an example method for placing a packet descriptor in an appropriate priority queue for egress, according to an embodiment.

FIG. 3 is a flow diagram of an example method 300 for enqueuing a packet for egress via a port, according to an embodiment. The method 300 is implemented by the enhanced AVB switch 108, in an embodiment. For example, the method 300 is implemented at least partially by the queue controller 128 for a port 112 via which the packet is to egress (egress port), where the egress port 112 is coupled to a device 104 operating according to the AVB protocol, in an embodiment. The method 300 is partially implemented by the ingress processing unit 116 corresponding to the ingress port 112 via which the packet ingressed, in an embodiment. The method 300 is described with respect to FIGS. 1 and 2 for ease of explanation. In other embodiments, the method 300 is implemented by another suitable network device.

At block 304, it is determined whether a frame priority indicator (FPRI) associated with the packet corresponds to a value of 3 (as an example), which corresponds to a Class A queue according to the AVB Standards (as a default). In an embodiment, the FPRI associated with the packet corresponds to an IEEE 802.1p PCP field in an IEEE 802.1Q VLAN tag of the packet, a priority indicator in distributed switching architecture (DSA) tag associated with the packet, etc. In an embodiment, the FPRI is set to the PCP field in the packet in at least some situations. In an embodiment, the FPRI is set to a default value or a determined value if the PCP field is not included in the packet and/or if the packet is a particular type of packet, in at least some situations. For example, in an embodiment, the FPRI is set to a particular value when it is determined that the packet is a management-type packet. Generally, a management-type packet corresponds to a packet utilized for managing a network. In an embodiment, a management-type packet is a packet with a destination address (DA) set to a multicast address equal to one of sixteen reserved addresses. Thus, in an embodiment, the FPRI is set to a particular value when it is determined that the DA of the packet is a multicast address equal to any one of sixteen reserved addresses.

If it is determined at block 304 that the FPRI value is 3 (as an example), the flow proceeds to block 308, at which a packet descriptor associated with the packet is enqueued in the priority queue 208-3, which corresponds to a Class A queue according to the AVB Standards when the queue controller 128 is appropriately configured.

On the other hand, if it is determined at block 304 that the FPRI value is not 3 (as an example), the flow proceeds to block 312. At block 312, it is determined whether the FPRI associated with the packet corresponds to a value of 2 (as an example), which corresponds to a Class B queue according to the AVB Standards (as a default). If the FPRI value is 2 (as an example), the flow proceeds to block 316, at which the packet descriptor associated with the packet is enqueued in the priority queue 208-2, which corresponds to a Class B queue according to the AVB Standards when the queue controller 128 is appropriately configured.

On the other hand, if it is determined at block 312 that the FPRI value is not 2 (as an example), the flow proceeds to block 320. At block 320, it is determined whether the packet is a management-type packet. If it is determined that the packet is a management-type packet, the flow proceeds to block 324, at which the packet descriptor associated with the packet is enqueued in the priority queue 208-2, Thus, in at least some situations, packets with a PCP field having a value other than 2 or 3 (as an example), or without a PCP field, are enqueued in a Class B AVB queue, in an embodiment. For example, management-type packets with a PCP field having a value other than 2 or 3 (as an example), or without a PCP field, are enqueued in the Class B AVB queue, in an embodiment.

On the other hand, if it is determined at block 320 that the packet is not a management-type packet, the flow proceeds to block 328. At block 328, the packet descriptor associated with the packet is enqueued in one of the priority queues 208-1, 208-0 based on the FPRI. For example, a first set of one or more FPRI values other than values 2 and 3 (as an example) correspond to priority queue 208-1, and a second set of one or more remaining FPRI values other than values 2 and 3 (as an example) correspond to priority queue 208-0, in an embodiment.

In another embodiment, management-type packets are enqueued in the priority queue 208-3, which corresponds to a Class A queue, rather than in the priority queue 208-2, which corresponds to a Class B queue.

Figure 4:
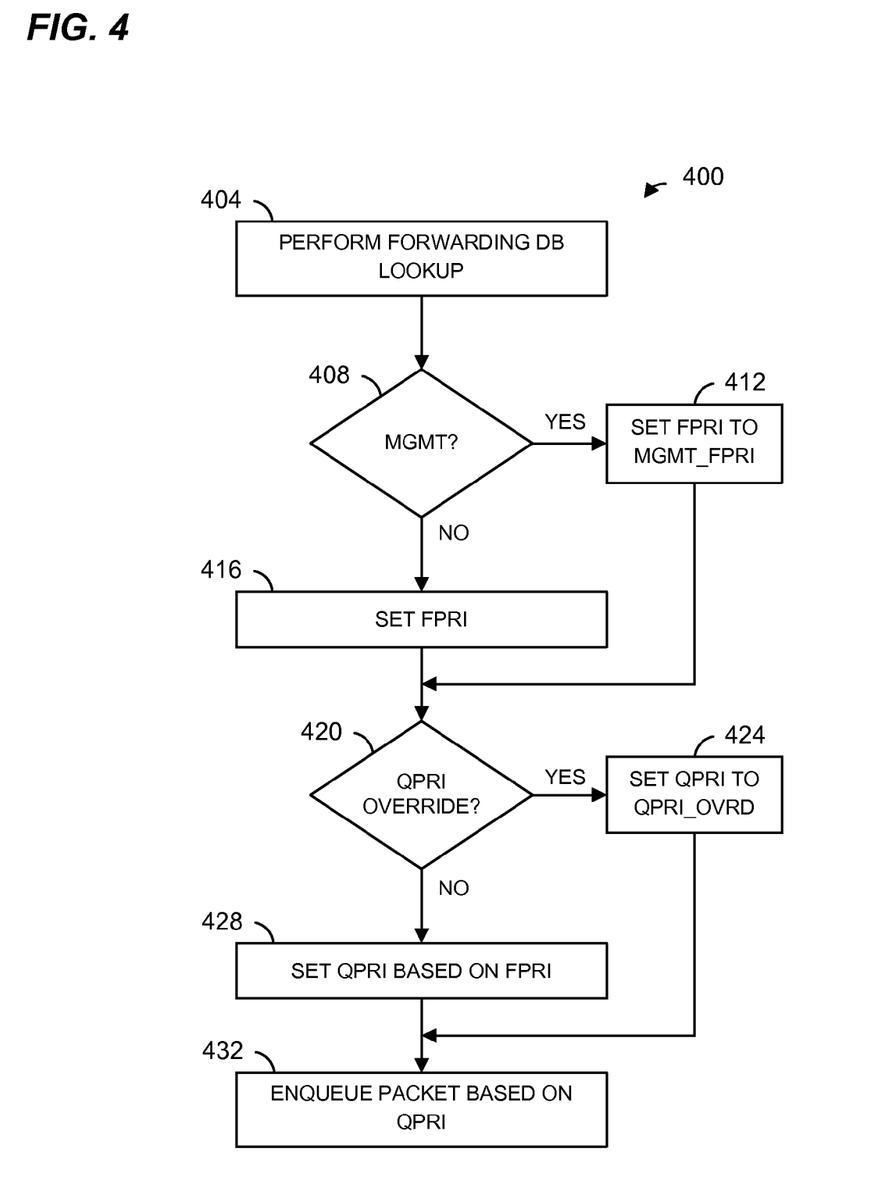
FIG. 4 is a flow diagram of another example method for placing a packet descriptor in an appropriate priority queue for egress, according to another embodiment.

FIG. 4 is a flow diagram of an example method 400 for enqueuing a packet for egress via a port, according to an embodiment. The method 400 is implemented by the enhanced AVB switch 108, in an embodiment. For example, the method 400 is implemented partially by the queue controller 128 for a port 112 via which the packet is to egress (egress port), where the egress port 112 is coupled to a device 104 operating according to the AVB protocol, in an embodiment. The method 400 is also partially implemented by the ingress processing unit 116 corresponding to the ingress port 112 via which the packet ingressed, in an embodiment. The method 400 is also partially implemented by the forwarding engine 124, in an embodiment. The method 400 is described with respect to FIGS. 1 and 2 for ease of explanation. In other embodiments, the method 400 is implemented by another suitable network device.

At block 404, a forwarding database lookup is performed. In an embodiment, the forwarding engine 124 performs a lookup in the database 126 using header information of the packet.

In an embodiment, the forwarding database 126 includes information that indicates, for packets with a given combination of header information (e.g., a given combination of one or more of a destination address (DA), a source address (SA), a VLAN tag, etc.), whether packets corresponding to the given combination are management-type packets. In an embodiment, the forwarding database 126 includes information that indicates packets with a DA set to a multicast address equal to one of sixteen reserved addresses is to be considered a management-type packet. In another embodiment, the forwarding database 126 additionally and/or alternatively includes information that indicates packets with a DA set to one or more addresses other than multicast addresses equal to one of sixteen reserved addresses is to be considered a management-type packet.

In an embodiment, the forwarding database 126 also includes information that indicates, for a packet with a given combination of header information (e.g., a given combination of one or more of a destination address (DA), a source address (SA), a VLAN tag, etc.), how the packets are to be enqueued. The information in the forwarding database 126 that indicates how packets are to be enqueued is referred to herein as a queue priority override information. In an embodiment, the queue priority override information includes i) an indicator for the given combination of header information of whether information in the forwarding database 126 should be used to enqueue a packet, and ii) if information in the forwarding database 126 should be used to enqueue the packet, information indicating how the packet is to be enqueued (e.g., an indicator of a priority queue).

At block 408, it is determined whether the packet is a management-type packet based on information obtained at block 404. If it is determined that the packet is a management-type packet, the flow proceeds to block 412, at which a frame priority indicator (FPRI) associated with the packet is set to a value corresponding to a desired priority for management-type packets (MGMT_FPRI).

On the other hand, if it is determined at block 408 that the packet is not a management-type packet, the flow proceeds to block 416, at which an FPRI associated with the packet is set to a value based on information in the packet. In an embodiment and in some situations, the FPRI is set to an IEEE 802.1p PCP field in an IEEE 802.1Q VLAN tag of the packet, a priority indicator in a DSA tag associated with the packet, etc. In an embodiment, the FPRI is set to a default value or a determined value if the PCP field is not included in the packet.

Both blocks 412 and 416 flow to block 420. At block 420, it is determined whether information from the forwarding database lookup at block 404 indicates a queue priority override. If there is a queue priority override, the flow proceeds to block 424, at which a queue priority indicator (QPRI) is set to a queue priority value from the information from the forwarding database lookup at block 404.

On the other hand, if it is determined at block 420 that the information from the forwarding database lookup at block 404 does not indicate a queue priority override, the flow proceeds to block 428. At block 428, the QPRI is set to a value based on the FPRI.

Both blocks 424 and 428 flow to block 432. At block 432, the packet is enqueued based on the QPRI. In an embodiment, the demultiplexer unit 220 utilizes the QPRI to select one of priority queues 208 in which to place the packet. In an embodiment, the QPRI is included in or is associated with the packet descriptor corresponding to the packet, and when the packet descriptor is passed to the queue controller 128 and is received by the demultiplexer unit 220 for transfer to the egress port 112, the demultiplexer unit 220 determines the appropriate priority queue 208 based on the QPRI.

In an embodiment, blocks 408, 412, 416, 420, 424 and 428 are implemented by the ingress processing unit 116. In an embodiment, block 432 is implemented by the queue controller 128.

Figure 5:
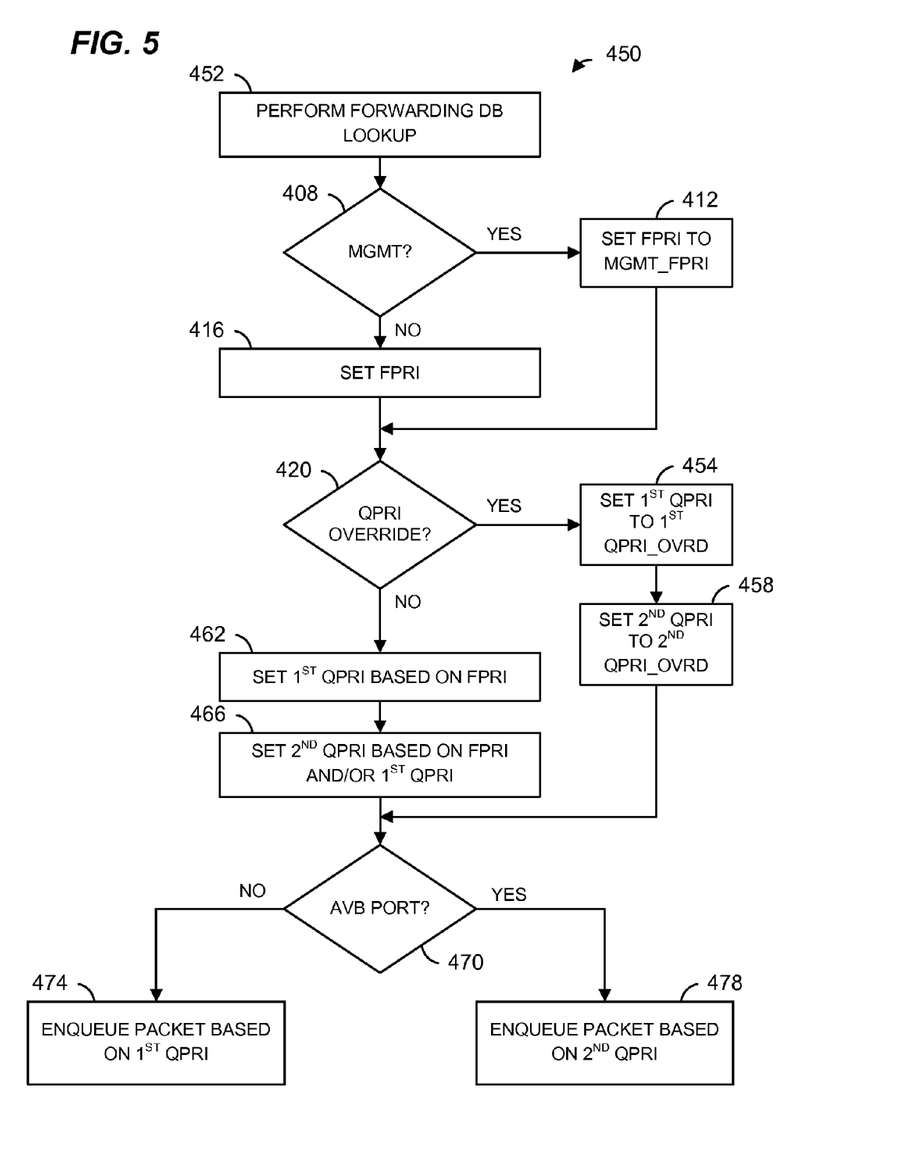
FIG. 5 is a flow diagram of another example method for placing a packet descriptor in an appropriate priority queue for egress, according to another embodiment.

FIG. 5 is a flow diagram of an example method 450 for enqueuing a packet for egress via a port, according to another embodiment. The method 450 is implemented by the enhanced AVB switch 108, in an embodiment. For example, the method 450 is implemented partially by the queue controller 128 for a port 112 via which the packet is to egress (egress port), where the egress port 112 is coupled to a device 104 operating according to the AVB protocol, in an embodiment. The method 450 is also partially implemented by the ingress processing unit 116 corresponding to the ingress port 112 via which the packet ingressed, in an embodiment. The method 450 is also partially implemented by the forwarding engine 124, in an embodiment. The method 450 is similar to the method 400, and like-numbered blocks are not discussed again for brevity. The method 450 is described with respect to FIGS. 1 and 2 for ease of explanation. In other embodiments, the method 400 is implemented by another suitable network device.

At block 452, a forwarding database lookup is performed. In an embodiment, the forwarding engine 124 performs a lookup in the database 126 using header information of the packet.

In an embodiment, the forwarding database 126 includes information similar to the database information discussed above with respect to block 404 of FIG. 4. In an embodiment, the queue priority override information includes i) an indicator for the given combination of header information of whether information in the forwarding database 126 should be used to enqueue a packet, and ii) if information in the forwarding database 126 should be used to enqueue the packet, a) first information indicating how the packet is to be enqueued (e.g., a first indicator of a priority queue) when the egress port is configured as a non-AVB port, and b) second information indicating how the packet is to be enqueued (e.g., a second indicator of a priority queue) when the egress port is configured as an AVB port.

If it is determined at block 420 that there is a queue priority override, the flow proceeds to block 454, at which a first queue priority indicator (QPRI) is set to a first queue priority value from the information from the forwarding database lookup at block 452. The first QPRI corresponds to an indication of a priority queue in which the packet is to be placed if the egress port is configured as a non AVB port. At block 458, a second QPRI is set to a second queue priority value from the information from the forwarding database lookup at block 452. The second QPRI corresponds to an indication of a priority queue in which the packet is to be placed if the egress port is configured as an AVB port.

If it is determined at block 420 that the information from the forwarding database lookup at block 452 does not indicate a queue priority override, the flow proceeds to block 462. At block 462, the first QPRI is set to a value based on the FPRI. Again, the first QPRI corresponds to an indication of a priority queue in which the packet is to be placed if the egress port is configured as a non_AVB port. At block 466, the second QPRI is set to a value based on the FPRI and/or the first QPRI. Again, the second QPRI corresponds to an indication of a priority queue in which the packet is to be placed if the egress port is configured as an AVB port.

Both blocks 458 and 466 flow to block 470. At block 470, it is determined whether the egress port (i.e., the port via which the packet is to egress) is coupled to an AVB device (i.e., is an AVB port). If the egress port is not an AVB port, the flow proceeds to block 274. At block 274, the packet is enqueued based on the first QPRI. In an embodiment, the demultiplexer unit 220 utilizes the first QPRI to select one of priority queues 208 in which to place the packet. In an embodiment, the first QPRI is included in or is associated with the packet descriptor corresponding to the packet, and when the packet descriptor is passed to the queue controller 128 and is received by the demultiplexer unit 220 for transfer to the egress port 112, the demultiplexer unit 220 determines the appropriate priority queue 208 based on the first QPRI.

On the other hand, if it is determined at block 470 that the egress port is an AVB port, the flow proceeds to block 278. At block 278, the packet is enqueued based on the second QPRI. In an embodiment, the demultiplexer unit 220 utilizes the second QPRI to select one of priority queues 208 in which to place the packet. In an embodiment, the second QPRI is included in or is associated with the packet descriptor corresponding to the packet, and when the packet descriptor is passed to the queue controller 128 and is received by the demultiplexer unit 220 for transfer to the egress port 112, the demultiplexer unit 220 determines the appropriate priority queue 208 based on the second QPRI.

In an embodiment, blocks 408, 412, 416, 420, 454, 458, 462 and 466 are implemented by the ingress processing unit 116. In an embodiment, blocks 470, 474 and 478 are implemented by the queue controller 128.

In an embodiment, configuration information for each port includes information indicating whether a packet that is to egress via the port should be enqueued using the second QPRI even if it is determined that the egress port is not an AVB port. Thus, in an embodiment, if it is determined at block 470 that the egress port is not an AVB port, it is then determined whether the configuration information for the egress port indicates that the second QPRI should be utilized. If the configuration information for the egress port indicates that the second QPRI should be utilized, the flow proceeds to block 478. If the configuration information for the egress port does not indicate that the second QPRI should be utilized, the flow proceeds to block 474. In another embodiment, the forwarding database 126 includes information indicating whether the packet should be enqueued using the second QPRI even if it is determined that the egress port is not an AVB port.

Referring to FIGS. 4 and 5, in some embodiments, the information is retrieved from a suitable database that is not a forwarding database at blocks 404 and/or 452.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, implemented in a network device that supports an audio video bridge (AVB) protocol, the method comprising:
   receiving a packet at an ingress port of a plurality of ports of the network device, each of the plurality of ports having a respective ingress port processor;
   performing, at an ingress port processor of the ingress port, a lookup in a database using header information of the packet to obtain queue priority override information that indicates how the packet is to be enqueued at an egress port of the plurality of ports;
   setting, at the ingress port processor and based on the queue priority override information obtained from the lookup, a first queue priority indicator to a first value and a second queue priority indicator to a second value, for a packet descriptor corresponding to the packet;
   sending, by the ingress port processor, the packet descriptor with the first queue priority indicator and the second queue priority indicator to a queue controller having a plurality of demultiplexers, each demultiplexer corresponding to a respective port of the plurality of ports, the plurality of demultiplexers having a demultiplexer that corresponds to the egress port of the plurality of ports for the packet, wherein the demultiplexer is coupled with each of a plurality of packet descriptor queues for the egress port;
   determining, by the queue controller, whether the egress port is coupled to an AVB device or a non-AVB device;
   selecting, by the queue controller, the first queue priority indicator in response to determining that the egress port is coupled to the non-AVB device;
   selecting, by the queue controller, the second queue priority indicator in response to determining that the egress port is coupled to the AVB device;
   enqueueing, by the demultiplexer, the packet descriptor corresponding to the packet in a descriptor queue of the plurality of packet descriptor queues for the egress port that corresponds to the selected queue priority indicator; and
   transmitting the packet via the egress port according to the descriptor queue.

2. The method of claim 1, wherein setting the first queue priority indicator to the first value and the second queue priority indicator to the second value comprises:
   determining whether the queue priority override information indicates that the queue priority override information is to be used to enqueue the packet;
   setting the first queue priority indicator to the first value, where the first value is based on the queue priority override information, and the second queue priority indicator to the second value, where the second value is based on the queue priority override information, in response to determining that the queue priority override information indicates that the queue priority override information is to be used to enqueue the packet; and
   setting the first queue priority indicator to the first value, where the first value is based on frame priority information of the header information of the packet, and the second queue priority indicator to the second value, where the second value is based on the frame priority information, in response to determining that the queue priority override information indicates that the queue priority override information is not to be used to enqueue the packet.

3. The method of claim 2, wherein the frame priority information is an Institute for Electrical and Electronics Engineers 802.1p priority code point (PCP) field of the packet and the first value corresponds to the PCP field.

4. The method of claim 2, wherein the queue priority override information includes the first value and the second value.

5. The method of claim 1, wherein the database is a forwarding database.

6. The method of claim 1, wherein the egress port is a first egress port and the method further comprises determining a plurality of egress ports for the packet that includes the first egress port and a second egress port;
   wherein selecting the first queue priority indicator comprises:
      selecting the first queue priority indicator for the first egress port in response to determining that the first egress port is coupled to the non-AVB device, and
      selecting the first queue priority indicator for the second egress port in response to determining that the second egress port is coupled to the non-AVB device;
   wherein selecting the second queue priority indicator comprises:
      selecting the second queue priority indicator for the first egress port in response to determining that the first egress port is coupled to the AVB device, and
      selecting the second queue priority indicator for the second egress port in response to determining that the second egress port is coupled to the AVB device;
   wherein enqueueing the packet descriptor comprises:
      enqueueing a first packet descriptor corresponding to the packet according to the selected queue priority indicator for the first egress port, and
      enqueuing a second packet descriptor corresponding to the packet according to the selected queue priority indicator for the second egress port.

7. The method of claim 1, wherein selecting the first queue priority indicator in response to determining that the egress port is coupled to the non-AVB device comprises:
  determining configuration information for the egress port that indicates whether the second queue priority indicator is to be utilized even though the egress port is coupled to the non-AVB device;
  selecting the second queue priority indicator in response to determining that the configuration information indicates that the second queue priority indicator is to be utilized even though the egress port is coupled to the non-AVB device.

8. The method of claim 1, wherein performing the lookup in the database comprises:
  performing the lookup in the database using the header information to obtain information that indicates whether the packet is a management-type packet; and
  setting frame priority information of the header information of the packet to a value corresponding to a desired priority for management-type packets in response to determining that the packet is the management-type packet.

9. The method of claim 8, wherein the frame priority information is an Institute for Electrical and Electronics Engineers 802.1p priority code point (PCP) field of the packet.

10. The method of claim 8, wherein determining whether the packet is a management-type packet comprises determining that the packet is a management-type packet in response to determining that a destination address of the packet is a multicast address reserved for management-type packets.

11. A network device, comprising:
  a plurality of ports including at least an ingress port and an egress port;
  a plurality of ingress processors, each ingress processor of the plurality of ingress processors corresponding to a respective port of the plurality of ports;
  a queue controller that supports an Audio Video Bridging (AVB) protocol, the queue controller having a plurality of demultiplexers, each demultiplexer of the plurality of demultiplexers corresponding to a respective port of the plurality of ports, each demultiplexer of the plurality of demultiplexers coupled with a respective plurality of packet descriptor queues for the corresponding port of the plurality of ports, wherein
    a first demultiplexer of the queue controller corresponds to the egress port and a first plurality of packet descriptor queues, each packet descriptor queue of the first plurality of packet descriptor queues corresponding to a different priority value;
  wherein an ingress processor of the plurality of ingress processors that corresponds to the ingress port is configured to
    perform a lookup in a database using header information of a packet received via the ingress port to obtain queue priority override information that indicates how the packet is to be enqueued at the egress port of the plurality of ports,
    set a first queue priority indicator for a packet descriptor corresponding to the packet to a first value and a second queue priority indicator for the packet descriptor to a second value based on the queue priority override information obtained from the lookup, and
    send the packet descriptor with the first queue priority indicator and the second queue priority indicator to the queue controller;
  wherein the queue controller is configured to
    determine whether the egress port is coupled to an AVB device or a non-AVB device,
    select the first queue priority indicator in response to determining that the egress port is coupled to the non-AVB device, and
    select the second queue priority indicator in response to determining that the egress port is coupled to the AVB device;
  wherein the first demultiplexer is configured to enqueue the packet descriptor corresponding to the packet in a descriptor queue of the plurality of packet descriptor queues for the egress port that corresponds to the selected queue priority indicator; and
  wherein the network device is configured to transmit the packet via the egress port according to the descriptor queue.

12. The network device of claim 11, wherein the ingress port processor is configured to
  determine whether the queue priority override information indicates that the queue priority override information is to be used to enqueue the packet,
  set the first queue priority indicator to the first value and the second queue priority indicator to the second value in response to determining that the queue priority override information indicates that the queue priority override information is to be used to enqueue the packet, wherein the first value and the second value are based on the queue priority override information, and
  set the first queue priority indicator to the first value and the second queue priority indicator to the second value in response to determining that the queue priority override information indicates that the queue priority override information is not to be used to enqueue the packet, wherein the first value and the second value are based on frame priority information of the header information of the packet.

13. The network device of claim 12, wherein the frame priority information is an Institute for Electrical and Electronics Engineers 802.1p priority code point (PCP) field of the packet and the first value corresponds to the PCP field.

14. The network device of claim 12, wherein the queue priority override information includes the first value and the second value.

15. The network device of claim 11, wherein the database is a forwarding database.

16. The network device of claim 11, wherein the egress port is a first egress port and the ingress port processor is configured to determine a plurality of egress ports for the packet that includes the first egress port and a second egress port;
  wherein the queue controller is configured to
    select the first queue priority indicator for the first egress port in response to determining that the first egress port is coupled to the non-AVB device,
    select the second queue priority indicator for the first egress port in response to determining that the first egress port is coupled to the AVB device,
    select the first queue priority indicator for the second egress port in response to determining that the second egress port is coupled to the non-AVB device,
    select the second queue priority indicator for the second egress port in response to determining that the second egress port is coupled to the AVB device;

wherein the first demultiplexer is configured to
enqueue a first packet descriptor corresponding to the packet according to the selected queue priority indicator for the first egress port, and
enqueue a second packet descriptor corresponding to the packet according to the selected queue priority indicator for the second egress port.

17. The network device of claim 11, wherein the queue controller is configured to
determine, in response to determining that the egress port is coupled to the non-AVB device, configuration information for the egress port that indicates whether the second queue priority indicator is to be utilized even though the egress port is coupled to the non-AVB device, and
select the second queue priority indicator in response to determining that the configuration information indicates that the second queue priority indicator is to be utilized even though the egress port is coupled to the non-AVB device.

18. The network device of claim 11, wherein the ingress port processor is configured to
perform the lookup in the database using the header information to obtain information that indicates whether the packet is a management-type packet, and
set, in response to determining that the packet is the management-type packet, frame priority information of the header information of the packet to a value corresponding to a desired priority for management-type packets.

19. The network device of claim 18, wherein the frame priority information is an Institute for Electrical and Electronics Engineers 802.1p priority code point (PCP) field of the packet.

20. The network device of claim 18, wherein the ingress port processor is configured to determine that the packet is a management-type packet in response to determining that a destination address of the packet is a multicast address reserved for management-type packets.

* * * * *